United States Patent

[11] 3,621,290

[72] Inventor Thomas B. Fryer
Saratoga, Calif.
[21] Appl. No. 865,106
[22] Filed Oct. 9, 1969
[45] Patented Nov. 16, 1971
[73] Assignee The United States of America as represented by the Administrator of the National Aeronautics and Space Administration

[54] RF-CONTROLLED SOLID-STATE SWITCH
6 Claims, 11 Drawing Figs.

[52] U.S. Cl. .......... 307/247,
128/2 R, 128/2.1 A, 307/231, 307/288, 325/29, 325/492, 340/171, 340/203
[51] Int. Cl. .......... H03k 17/60
[50] Field of Search .......... 307/247, 288, 231; 325/29, 118, 185, 186; 340/151, 203, 171; 343/6.8; 128/2, 419–423, 2.1 A, 2 P

[56] References Cited

UNITED STATES PATENTS

| | | | |
|---|---|---|---|
| 2,776,420 | 1/1957 | Woll | 307/288 X |
| 2,963,692 | 12/1960 | Barter et al. | 307/288 X |
| 3,195,540 | 7/1965 | Waller | 128/422 |
| 3,235,749 | 2/1966 | Pokrant | 307/288 X |
| 3,440,347 | 4/1969 | Spencer et al. | 179/1 |

*Primary Examiner*—Stanley D. Miller, Jr.
*Attorneys*—Darrell G. Brekke and G. T. McCoy ABSTRACT: An electronic element, capable of presenting either a high impedance or a low impedance between a power source and an instrument, is switched from its high impedance to its low impedance state by turning on both active elements of a complementary bistable multivibrator. By momentarily short-circuiting one of the two active elements of the complementary bistable multivibrator, thereby driving its two active elements from the on to the off state, the electronic element is switched back from its low impedance to its high impedance state. When off, this circuit consumes essentially zero standby power.

Alternative-switching circuits use symmetrical bistable multivibrators, activated by amplified and rectified transmitted pulses, to switch a gating element from its high impedance to its low impedance state, and vice versa.

INVENTOR
THOMAS B. FRYER

BY [signature]

[signature]

ATTORNEYS.

FIG. 4a-4g.
FIG. 4a.
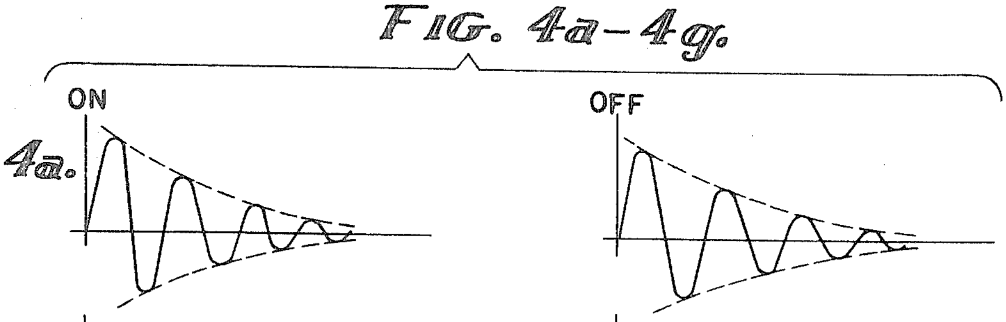
FIG. 4b.
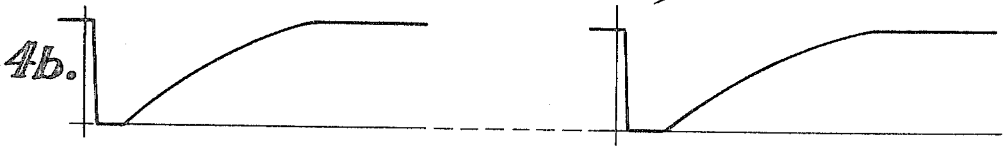
FIG. 4c.
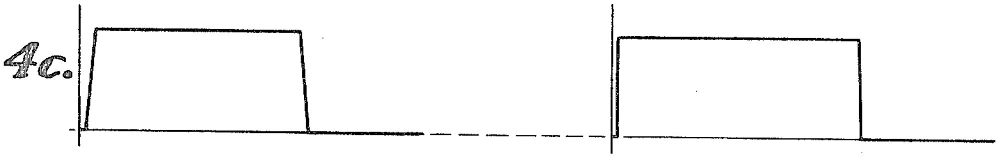
FIG. 4d.
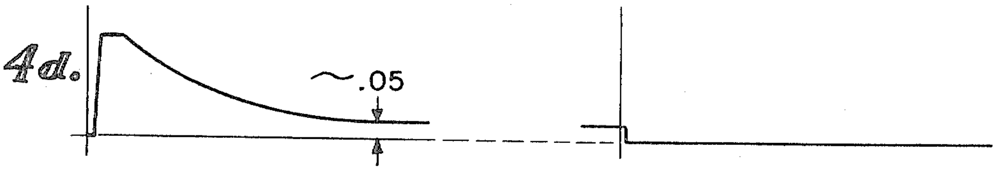
FIG. 4e.
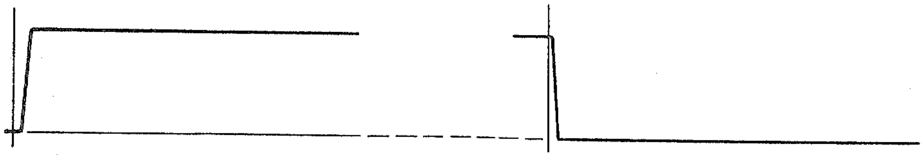
FIG. 4f.
FIG. 4g.
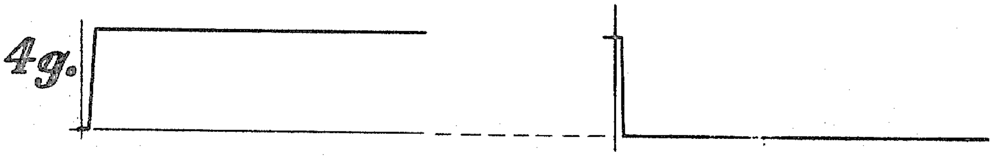
INVENTOR
THOMAS B. FRYER
BY
ATTORNEYS.

INVENTOR
THOMAS B. FRYER
BY
ATTORNEYS.

RF-CONTROLLED SOLID-STATE SWITCH

The invention described herein was made by an employee of the U.S. Government and may be manufactured and used by or for the Government for governmental purposes without the payment of any royalties thereon or therefor.

BACKGROUND OF THE INVENTION

1. Field of Invention

This invention relates to telemetry-actuated switches and in particular to switches which consume essentially zero power during standby condition.

2. Prior Art

Switches for turning on and off remote equipment are particularly useful in areas where it is difficult or impossible for a person to physically operate the equipment. Unattended weather stations, satellites, and pipeline valves typically are controlled from distant stations by signals transmitted by radio or over wires.

One area where remote control of switches is particularly desirable is in the biomedical area. Electronic circuits are often implanted in animals to monitor body functions. These circuits are periodically actuated to transmit the measured body parameters to the researcher. It is usually undesirable to physically approach the animal to actuate the switch. Thus remote actuation by telemetry is essential. Furthermore, it is desirable to monitor the body functions of animals over long periods of time. This requires a telemetry system with long life in the animal. Thus an essential feature of a switch for use in such a telemetry system is that the switch consume an extremely small amount of power or, indeed, essentially no power, during the quiescent periods between interrogation.

Typically, magnetically actuated switches have been used for on-off control of implanted electronics in animals. Such switches have the disadvantage that if the animal wanders close to metallic objects, the magnetic switches might be inadvertently actuated and thus drain the equipment's power.

SUMMARY OF THE INVENTION

This invention overcomes this disadvantage of prior art switches. This invention provides an electronic switch, capable of being actuated by a radio signal, which consumes essentially zero power during quiescent periods between interrogation. The circuit of this invention is particularly suitable for implementation as an integrated circuit. Thus, the switch of this invention is capable of being microminiaturized, an important advantage for a switch capable of being implanted in an animal.

According to this invention, a transmitted actuating signal is detected by a tuned antenna and then rectified and amplified by a differential amplifier. The rectified and amplified signal is then used to pulse a bistable circuit from one state to a second state. In the second state, this bistable circuit turns on a power switch to allow power from a power supply to flow to an instrument, typically a biomedical instrument. A second signal switches the bistable circuit back to its first state thereby turning off the power switch.

During the quiescent period between interrogations, this circuit consumes power, albeit a small amount, to bias the rectifying and amplifying circuit which receives the signal detected by the antenna, and to hold the bistable circuit in its first state while the switching transistor is in the off condition.

According to a second embodiment of this invention, a signal, detected for example by a tuned antenna, is passed to a rectifying and amplifying circuit, normally off. The output signal from the amplifying circuit triggers on a complementary bistable multivibrator, both active elements of which are normally off. The bistable multivibrator in turn drives on a switch between a power source and an instrument. The switch stays on until a second pulse is received. This second pulse activates a circuit which short circuits one active element of the bistable multivibrator, driving both active elements in the complementary bistable multivibrator to their off state. This turns off the switch between the power source and the instrument.

DESCRIPTION OF THE DRAWINGS:

FIGS. 4*a* through 4*g* illustrate the waveforms at various locations throughout the circuit of FIG. 3.

DETAILED DESCRIPTION

Figure 1:
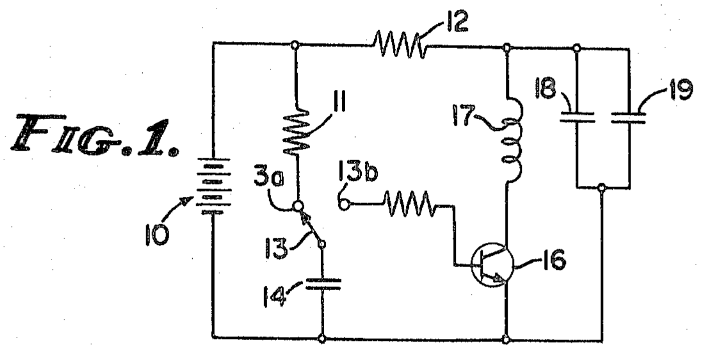
FIG. 1 shows a transmitter suitable for use in this invention.

A transmitter suitable for use with this invention is shown in FIG. 1. A battery 10 supplies power through resistor 11 to charge capacitor 14 when two-pole switch 13 is in contact with node **13*a*, as shown. After capacitor 14 has been charged, and when it is desired to transmit a signal to the circuit of this invention, switch 13 is moved to node 13*b*. Switch 13 can be either a manually operated or an electronic switch. The voltage across capacitor 14 drives the base of transistor 16 positive relative to its emitter. Transistor 16 is thus driven from the off to the on state, i.e. from its high impedance to its low impedance state. The tank circuit, consisting of parallel-connected capacitor 18, variable capacitor 19, and inductor 17, then resonates until the voltage across capacitors 18 and 19 drops to zero. Consequently, an exponentially decaying, sinusoidally varying signal is radiated from inductor 17. The frequency of this signal is just the resonant frequency of the tank circuit. Transistor 16 remains on until the charge on capacitor 14 has been dissipated by the base current of transistor 16**.

The transmitter shown in FIG. 1 is not a part of this invention. In essence, any standard transmitter operating at a desired frequency and capable of being pulsed either aperiodically or periodically can be used with the circuits of this invention.

Figure 2:
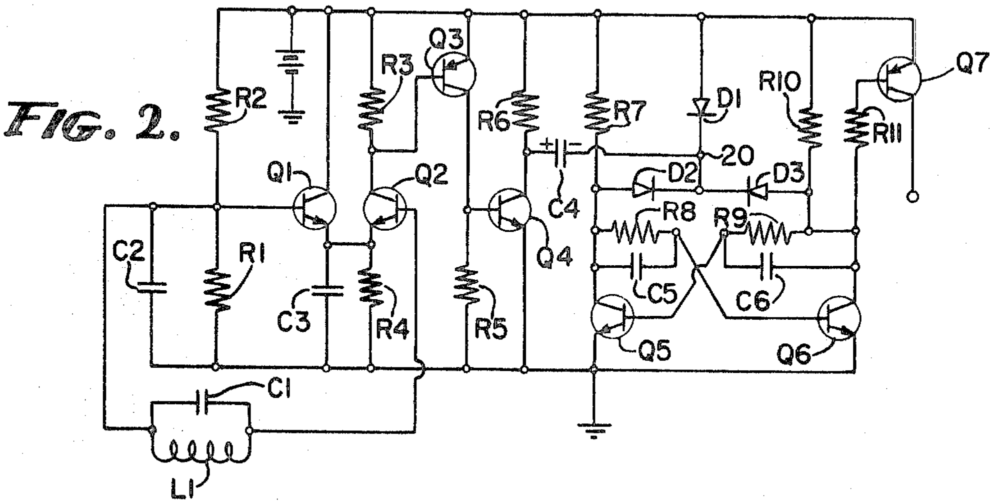
FIG. 2 shows one embodiment of a receiving and switching circuit constructed according to this invention.

FIG. 2 shows one embodiment of the typical receiver and switch circuit of this invention. This circuit has the disadvantage that it draws a standby current of about 8 microamps and thus consumes standby power while the switch is off.

In the circuit of FIG. 2, the signal transmitted from a transmitter, such as the transmitter shown in FIG. 1, is detected by a tuned antenna consisting of inductor L1 connected in parallel with capacitor C1. This resonant circuit, tuned to the same frequency as the transmitter, responds to a received signal broadcast from the transmitter. Typically, the center frequency of the transmitter and the tuned antenna is 2.5 megahertz. The signal detected by the tuned antenna is next amplified by a combined differential amplifier and rectifier consisting of transistors Q1 and Q2. Transistor Q1 and Q2 are biased by means of resistors R1 and R2 such that their base voltages are typically slightly positive, by about 0.5 volts, relative to their emitter voltages. Bias resistors R1 and R2 consume bias power at all times. Due to this forward bias, a small current normally flows through the collector and emitter circuits of transistors Q1 and Q2, thus dissipating power in resistors R3 and R4.

The tuned resonant circuit consisting of inductor L1 and capacitor C1 is coupled to ground at RF frequencies by capacitor C2. Thus when a signal is detected by the tuned antenna, the base of transistor Q1 is unaffected. But the base of transistor Q2 is cyclically driven positive and negative with respect to ground at the frequency of the received signal. In response thereto, Q2 is driven on. Although the base voltage of Q2 is alternately positive and negative, relative to ground, Q2 possesses a cutoff frequency beneath the frequency of the received signal. Thus Q2, once turned on, cannot respond rapidly enough to turn off for each negative half cycle of the received signal, and remains on.

When Q2 turns on, its collector voltage, which represents the voltage drop across resistor R3, drops from only about 0.5 volts or less beneath the supply voltage to a much lower voltage. This turns on normally off PNP-transistor Q3. The collector voltage of Q2, which is also the base voltage of transistor Q3, represents the inverted positive envelope of the received signal.

Capacitor C3 and resistor R4, connected in parallel between the emitters of both Q1 and Q2, and ground, filter and smooth the emitter voltages of these transistors.

The collector current of transistor Q3 creates a voltage drop across resistor R5 thereby turning on NPN-transistor Q4. Transistor Q4 immediately saturates, thereby bringing its collector voltage within 0.1 to 0.2 volts of its emitter voltage. This voltage change is transmitted through coupling capacitor C4, normally charged to about 0.5 volts with polarity as shown, to the node point 20 at the intersection of diodes D1, D2 and D3.

The symmetrical bistable circuit, consisting of cross-coupled transistors Q5 and Q6 together with associated resistors R7, R8, R9 and R10 and capacitors C5 and C6, is normally in the condition where Q5 is conducting and Q6 is turned off. Consequently, the collector voltage of Q5, which is just the supply voltage less the voltage drop across resistor R7, is essentially the base voltage on transistor Q6. The voltage change across resistor R6, when applied to the node 20 between diodes D1, D2 and D3, forward biases diode D3 thereby dropping the collector voltage of transistor Q6 from that of the voltage supply to almost ground. Because the voltage across capacitor C6 is essentially the product of the base current drawn by transistor Q5 times resistor R9, typically about 0.5 to 0.6 volts, a sudden drop in the collector voltage of Q6 forces the base of transistor Q5 negative, thereby shutting off transistor Q5. Consequently, the collector voltage of Q5 rises very suddenly, thereby raising the base voltage on Q6 and thus turning on transistor Q6. Transistor Q6 thus draws collector current through resistor R10. The voltage drop across resistor R10, transmitted to the base of PNP-transistor Q7 through resistor R11, thereby turns on and saturates transistor Q7. Transistor Q7 in turn is the switch or "gate" between the power supply and an instrument, such as a biomedical instrument. The detection of a transmitted signal thus leaves transistor Q6 conducting, transistor switch Q7 on, and transistor Q5 nonconducting.

To turn off switch Q7, a second pulse is transmitted. Because of the symmetrical nature of the bistable circuit containing transistors Q5 and Q6, this second pulse operates in the manner described above to turn off both transistor Q6 and transistor Q7, the switching transistor. With this second pulse, transistor Q5 is again turned on, to be left on during the quiescent interval between interrogations.

Figure 5:
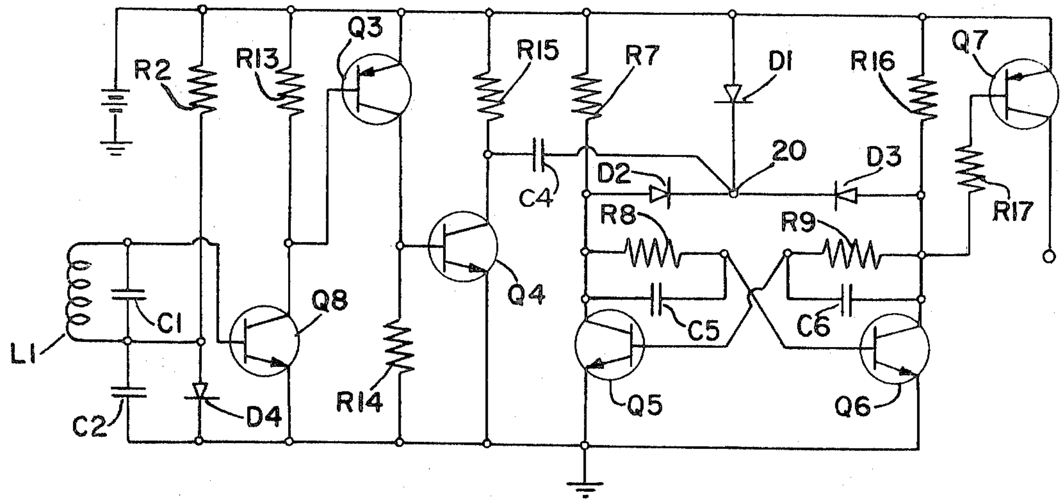
FIG. 5 shows a variation of the embodiment shown in FIG. 2.

A variation of the circuit shown in FIG. 2 is shown in FIG. 5. In the circuit of FIG. 5, all components identical in function and value to similar components in the circuit of FIG. 2 are identically numbered. The main difference between the circuit of FIG. 5 and that of FIG. 2 lies in the fact that the differential amplifier and rectifying circuit of FIG. 2, mainly transistors Q1 and Q2, have been replaced by a single transistor Q8. The emitter-base junction of Q8 is forward-biased by the voltage drop across forward-biased diode D4. This arrangement allows 8 to be turned on by the complete positive half cycle of the first cycle of each signal detected by inductor L1, rather than by just that portion of the first positive half cycle above the voltage drop across a PN-junction Furthermore, the turn-on voltage of Q8 is independent of temperature changes because both diode D4 and the emitter-base junction of Q8 are affected in the same way by such changes.

The circuit of FIG. 2 was constructed using the following component values.

| | | | |
|---|---|---|---|
| L1 | 125 μh. | R1 | 560 K |
| | | R2 | 560 K |
| C1 | 33 pf. | R3 | 390 K |
| C2 | 220 pf. | R4 | 68 K |
| C3 | 220 pf. | R5 | 68 K |
| C4 | 220 pf. | R6 | 330 K |
| C5 | 220 pf. | R7 | 330 K |
| C6 | 220 pf. | T8 | 470 K |
| | | R9 | 470 K |
| | | R10 | 330 K |
| | | R11 | 10 K |

| | | | |
|---|---|---|---|
| Q1 | 2N3129 | D1 | IN4154 |
| Q2 | 2N3629 | D2 | IN4154 |
| Q3 | NS6065 | D3 | IN4154 |
| Q4 | 2N3129 | | |
| Q5 | 2N3129 | | |
| Q6 | 2N3129 | | |
| Q7 | 2N3129 | | |

Selected components from the circuit of FIG. 2 as shown in FIG. 5, together with the following additional components were used to construct the circuit shown in FIG. 5.

| | | | |
|---|---|---|---|
| R13 | 120 K | Q8 | NS9715 |
| R14 | 120 K | | |
| R15 | 120 K | D4 | IN4154 |
| R16 | 100 K | | |
| R17 | 22 K | | |

Figure 3:
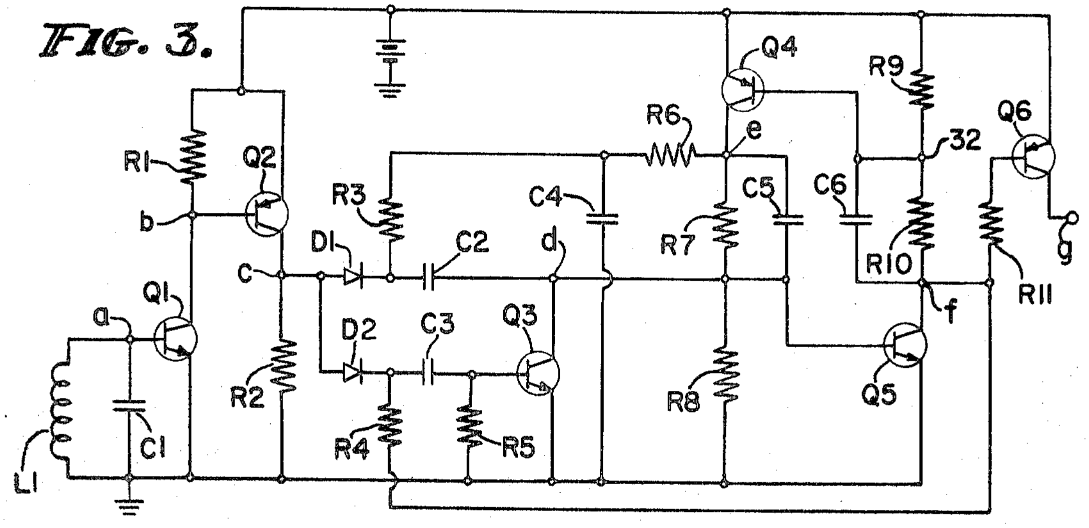
FIG. 3 shows a second embodiment of the receiver and switching circuit of this invention, this embodiment consuming substantially zero power during the off condition.

The circuits shown in FIGS. 2 and 5 have the drawback that between interrogations, a small amount of power is consumed, both to bias transistors Q1 and Q2 (FIG. 2) or transistor Q8 (FIG. 5) and by transistor Q5 (FIGS. 2 and 5) remaining on. The embodiment of this invention shown in FIG. 3 overcomes this problem by consuming no standby power between interrogations. Leakage currents in the circuit of FIG. 3 are on the order of a nanoamp or less. This is significantly beneath the internal leakage currents in a typical mercury battery.

As in the circuits of FIGS. 2 and 5, in FIG. 3 a transmitted signal is detected by a tuned antenna consisting of inductor L1 connected in parallel with capacitor C1 to form a tank circuit. This signal, shown in FIG. 4*a* as an exponentially decaying sinusoid, turns on transistor Q1, the collector current of which creates a voltage drop across resistor R1. Again, because the cutoff frequency of transistor Q1 is beneath the frequency of the received signal, transistor Q1, once turned on, remains on despite the alternating positive and negative voltage on its base. When Q1 turns on, its collector voltage, shown in FIGS. 4*b*, drops from the power supply voltage, typically 1.35 or 2.7 volts if one or two mercury batteries, respectively, are used for the power supply, to a fraction of a volt above ground. As the envelope of the base voltage exponentially decays, Q1's collector voltage rises exponentially back to the supply voltage, as shown in FIG. 4*b*. Q1 thus rectifies and inverts those positive portions of the signal on its base lead above a threshold voltage. This threshold voltage is just the turn-on voltage of a PN diode, about 0.5 volts at room temperature.

It should be noted here that the threshold voltage both increases the amplitude of the input signal necessary to turn on the switch of this invention, and decreases the sensitivity of this switch to noise.

The voltage drop across resistor R1 turns on PNP-transistor Q2, the collector current of which in turn passes through resistor R2. The voltage across R2, shown in FIG. 4*c*, forward biases diode D1. Diode D2, the cathode of which is connected through resistor R4 to the collector of normally-off transistor Q5, remains backbiased because when Q5 is off, its collector voltage is just the power supply voltage.

Capacitor C2, which initially contains zero charge, couples the change in Q1's collector voltage through to the base of NPN-transistor Q5, thereby forward-biasing transistor Q5. Transistor Q5 turns on, conducting current through its collector resistor R9 and initially through capacitor C6. The voltage drop across R9 forward-biases the base-emitter junction of PNP-transistor Q4, thereby turning on transistor Q4. Q4's collector current then flows through normally uncharged capacitor C5 and resistor R8, further forward-biasing the base-emitter junction of transistor Q5.

When capacitor C5 is fully charged, the collector current of Q4 flows through resistor R7 and then through the parallel combination of resistor R8 and the base-emitter junction of transistor Q5. When capacitor C6 is fully charged, the collector of Q5 flows through the parallel combination of resistor R9 and the base-emitter junction of transistor Q4 in series with resistor R10. Thus the turning on of transistors Q4 and Q5 is regenerative and both transistors Q4 and Q5 saturate.

The collector voltages on transistors Q4 and Q5 are shown in FIGS. 4*e* and 4*f* respectively. Q4's collector voltage is essentially the power supply voltage, while Q5's collector voltage is essentially ground.

With the decay of the received signal, as shown in FIG. 4*a*, the collector voltage of Q1 (which is also the base voltage on Q2) rises exponentially to the power supply voltage as shown in FIG. 4*b*, and transistor Q2 shuts off. Any charge which has build up on capacitor C2 dissipates through resistors R3, R6 and R7 and the voltage across this capacitor returns to zero. The voltage at node *d* on the base of transistor Q5 is just the voltage across the base-emitter junction of transistor Q5, about 0.5 volts at room temperature. This voltage is shown in FIG. 4*d*.

The collector voltage on transistor Q5 is applied through resistor R11 to the base of transistor Q6. When this collector voltage drops, as shown in FIG. 4*f*, PNP-transistor Q6 turns on and saturates. Transistor Q6 now provides a low impedance path for power to flow from the power supply to an instrument connected to the collector of Q6. Transistor Q6 remains on so long as transistors Q4 and Q5 remain on.

To switch transistor Q6 back to its high impedance state, and thus to shut off the flow of power from the power supply to an instrument connected to Q6's collector, a second signal is transmitted to the circuit. As with the initial signal which turned on this circuit, this second signal is detected by the inductor L1 and turns on transistor Q1 (See FIG. 4*a*). Transistor Q2, with base connected to Q1's collector, then turns on and saturates in response to the drop in Q1's collector voltage (FIG. 4*b*). The collector voltage of Q2 (FIG. 4*c*)again rises to the power supply voltage.

This time however, diode D2 becomes forward-biased because Q5's collector voltage (FIG. 4*f*) is at ground potential. Diode D1 is back-biased. The voltage drop across resistors R4 and R5, due to the current initially flowing through diode D2, drives NPN-transistor Q3 on, immediately saturating this normally off transistor.

When transistor Q3 saturates, its collector-to-emitter voltage becomes at most 0.2 volts. This short circuits the base-emitter junction of transistor Q5, driving transistor Q5 off. When Q5 shuts off, its collector voltage, and thus the base voltage on Q4, rises to the power supply voltage, thus shutting off Q4. The rise in Q5's collector voltage switches Q6 from its low impedance to its high impedance state.

It should be noted that the voltages across capacitors C5 and C6 are of such a polarity as to strongly reinforce the cutting off of transistors Q4 and Q5. Indeed, the turning-off of transistors Q4 and Q5 is also regenerative.

Transistor Q3 shuts off when capacitor C3 is fully charged.

The circuit of FIG. 3 μhconstructed using the following component values.

| | | | |
|---|---|---|---|
| L1 | 125 μh | Q1 | NS9715 |
| | | Q2 | NS6201 |
| C1 | 33 pf. | Q3 | 2N3129 |
| C2 | 100 pf. | Q4 | NS6201 |
| C3 | 100 pf. | Q5 | 2N3129 |
| C4 | 100 pf. | Q6 NS6211 | |
| C5 | 100 pf. | | |
| C6 | 100 pf. | C1 | IN4154 |
| | | D2 | IN4154 |
| R1 | 120 K | | |
| R2 | 120 K | | |
| R3 | 120 K | | |
| R4 | 120 K | | |
| R5 | 120 K | | |
| R6 | 180 K | | |
| R7 | 100 K | | |
| R8 | 100 K | | |
| B9 | 100 K | | |
| R10 | 100 K | | |
| R11 | 22 K | | |

This circuit operated as described above.

While this invention has been described with specific types of transistors serving specific functions, the transistor types employed can, of course, be reversed if appropriate biasing and diode polarity changes are made throughout the circuit.

What is claimed is:

1. A bistable switch which comprises a gating element capable of providing either a high impedance or a low impedance path between a power supply and a load; means for switching said gating element, said switching means being responsive to a first signal for switching said gating element to said low impedance state, said switching means being responsive to a second signal for switching said gating element to said high impedance state;

said switching means comprising means for detecting the receipt of said first and second signals, means for rectifying said first and second detected signals to produce the envelopes of said first and second signals, means for amplifying said envelopes to produce first and second intermediate signals, respectively, from said first and second signals, a complementary bistable multivibrator containing first and second active elements, said multivibrator being coupled to said gating element, both of said elements being normally off and said gating element being normally in its high impedance state, a first diode connected in series with a first capacitor, said series-connected diode and capacitor being coupled to said first active element in said complementary bistable multivibrator and said first diode, normally back-biased, being forward-biased by said first intermediate signal, thereby turning on said first and second active elements and switching said gating element to its low impedance state.

2. Structure as in claim 1 wherein said switching means further comprises:

a second diode connected in series with a second capacitor;

a third active element connected to said second capacitor, said second diode, normally back-biased, being forward-biased by said second intermediate signal, so that said second intermediate signal passes through said second diode and said second capacitor to turn on said third active element, said third active element being connected so as to short circuit said first active element on receipt of said second intermediate signal, thereby driving said first active element and said second active element from the on state to the off state and thus switching said gating element from its low impedance to its high impedance state.

3. Structure as in claim 2 wherein said first and second active elements comprise:

a first conductivity-type transistor and a second opposite conductivity-type transistor, respectively, both transistors containing a base lead, an emitter lead, and a collector lead, the base of said first conductivity-type transistor being coupled to the collector of said second opposite conductivity-type transistor by a first parallel combination of a resistor and a capacitor, the base of said second opposite conductivity-type transistor being coupled to the collector of said first conductivity-type transistor by a second parallel combination of a resistor and a capacitor, said first parallel combination being connected in series with a resistor between the collector of said second opposite conductivity-type transistor and ground, said second parallel combination being connected in series with a resistor between the collector of said first conductivity-type transistor and a power supply, said emitter lead of said first conductivity-type transistor being grounded, said emitter lead of said second opposite conductivity-type transistor being connected to said power supply, and said base lead and said emitter lead of said first conductivity-type transistor being additionally connected to said third active element.

4. Structure as in claim 3 in which said second diode is connected to remain back-biased during the receipt of said first signal by said detecting means while said first diode is connected to remain back-biased during the receipt of said second signal by said detecting means.

5. Structure as in claim 4 wherein a resistor couples said gating element to said collector of said first conductivity-type transistor.

6 Structure as in claim 5 in which said gating element comprises a first transistor the base of which is connected through said resistor to said collector of said first conductivity-type transistor, the emitter of which is connected to a power supply, and the collector of which is connected to a load.

* * * * *